US010303929B2

(12) United States Patent
Garrett

(10) Patent No.: US 10,303,929 B2
(45) Date of Patent: May 28, 2019

(54) FACIAL RECOGNITION SYSTEM

(71) Applicant: BOSE CORPORATION, Framingham, MA (US)

(72) Inventor: George Sean Garrett, Sherborn, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/335,774

(22) Filed: Oct. 27, 2016

(65) Prior Publication Data

US 2018/0121712 A1 May 3, 2018

(51) Int. Cl.
| | |
|---|---|
| G06K 9/00 | (2006.01) |
| G10L 13/04 | (2013.01) |
| H04R 1/40 | (2006.01) |
| H04N 5/232 | (2006.01) |
| H04R 1/02 | (2006.01) |
| G06F 1/16 | (2006.01) |

(52) U.S. Cl.
CPC ..... *G06K 9/00288* (2013.01); *G06K 9/00228* (2013.01); *G10L 13/043* (2013.01); *H04N 5/23219* (2013.01); *H04R 1/028* (2013.01); *H04R 1/406* (2013.01); *G06F 1/163* (2013.01); *G06T 2207/30201* (2013.01); *H04R 2499/11* (2013.01)

(58) Field of Classification Search
None
See application file for complete search history.

(56) References Cited

U.S. PATENT DOCUMENTS

| | | | |
|---|---|---|---|
| 5,384,609 A | 1/1995 | Ogawa et al. | |
| 2001/0050710 A1* | 12/2001 | Ellis | H04N 7/142 348/211.99 |
| 2001/0051049 A1 | 12/2001 | Horiguchi | |
| 2002/0071595 A1* | 6/2002 | Pirim | G06K 9/00228 382/107 |
| 2002/0109579 A1* | 8/2002 | Pollard | G06K 9/00221 340/5.53 |
| 2002/0176004 A1 | 11/2002 | Shinada | |

(Continued)

FOREIGN PATENT DOCUMENTS

JP 2012029209 A 2/2012

OTHER PUBLICATIONS

Boone, John, "Just When You Thought Google Glass Couldn't Get Creepier: New App Allows Strangers to ID You Just by Looking at You", E! Entertainment Television, LLC, Feb. 2014. Retrieved from http://www.eonline.com/news/507361/just-when-you-thought-google-glass-couldn-t-get-creepier-new-app-allows-strangers-to-id-you-just-by-looking-at-you.

(Continued)

*Primary Examiner* — Ryan P Potts
(74) *Attorney, Agent, or Firm* — Lando & Anastasi, LLP

(57) ABSTRACT

A recognition system includes a camera, at least one speaker, a microphone, and a processor in communication with the camera, the speaker, and the microphone. The processor is configured to recognize faces or devices and to receive a selection of at least one face or device to be monitored. The processor is also configured to direct the camera and/or the microphone toward the selected face or device and provide audio from the selected face or device to the speaker.

22 Claims, 7 Drawing Sheets

(56) References Cited

U.S. PATENT DOCUMENTS

| | | | | |
|---|---|---|---|---|
| 2006/0104454 A1* | 5/2006 | Guitarte Perez | ........ | G06F 3/011 381/71.6 |
| 2007/0201847 A1* | 8/2007 | Lei | .................... | G02B 27/0093 396/51 |
| 2010/0245585 A1 | 9/2010 | Fisher et al. | | |
| 2011/0063405 A1* | 3/2011 | Yam | ..................... | H04M 9/082 348/14.08 |
| 2011/0213664 A1* | 9/2011 | Osterhout | ............ | G02B 27/017 705/14.58 |
| 2011/0285807 A1* | 11/2011 | Feng | ................. | G06K 9/00228 348/14.08 |
| 2012/0081504 A1* | 4/2012 | Ng | ........................ | H04N 7/142 348/14.08 |
| 2014/0294257 A1* | 10/2014 | Tussy | ................ | G06F 17/30247 382/118 |
| 2014/0295915 A1 | 10/2014 | Zhong et al. | | |
| 2015/0172830 A1 | 6/2015 | Liu et al. | | |
| 2015/0237455 A1 | 8/2015 | Mitra et al. | | |
| 2015/0281832 A1 | 10/2015 | Kishimoto et al. | | |
| 2015/0304532 A1 | 10/2015 | Bart et al. | | |
| 2015/0341734 A1* | 11/2015 | Sherman | .............. | H04R 25/407 381/92 |
| 2016/0187763 A1 | 6/2016 | Fromm | | |
| 2017/0318199 A1 | 11/2017 | Fontana et al. | | |

OTHER PUBLICATIONS

International Search Report and Written Opinion for application No. PCT/US2017/058511 dated Jan. 30, 2018.

* cited by examiner

FACIAL RECOGNITION SYSTEM

FIELD

This disclosure relates to systems, methods, and apparatuses for performing facial or feature recognition with a pair of headphones and a camera to improve communication and listening.

BACKGROUND

Cameras are used in tandem with headphones, headsets, earpieces or wearable speakers to help augment the user's experiences in daily life. Such devices may be used to recognize objects and provide a user with audio cues relevant to such objects. Using facial or feature recognition software, such devices may be used to recognize individuals or object, provide information about an individual, or improve communications with an individual. Thus, there exists a need for a headphone and camera device that utilizes facial or feature recognition technologies to improve communication and listening.

SUMMARY

This disclosure relates to systems, methods, and apparatuses for performing facial or feature recognition with a pair of headphones and a camera to improve communication and listening.

All examples and features mentioned below can be combined in any technically possible way.

A recognition system is provided for that includes a camera, at least one speaker, a microphone, and a processor in communication with the camera, the speaker, and the microphone. The processor is configured to recognize faces or devices and to receive a selection of at least one face or device to be monitored. The processor is also configured to direct at least one of the camera or the microphone toward the selected face or device and provide audio from the selected face or device to the speaker. In some examples of the recognition system, the microphone is an arrayed microphone and the processor may be configured to direct the microphone toward a selected face or device using beamforming techniques. In other examples, the camera may be a movable joint and a controllable servo for directing the camera toward the selected face or device and the processor may be configured to direct the camera toward the selected face or device using the controllable servo. The processor may also be configured to compare a pre-recorded image of the face or device to be monitored with images captured by the camera in order to determine the position of the face or device to be monitored.

The recognition system may also include communications hardware for transferring data over a network. In such examples, the processor may also be configured to access a pre-recorded image of the face or device to be monitored via the communications hardware. The processor may also be configured to access a pre-recorded image of the face or device to be monitored via a social network.

In some examples, the processor may be configured to generate a faceprint based on a facial image. In such examples, the processor may also be configured to compare at least one stored faceprint of the face to be monitored with a faceprint derived from an image captured by the camera in order to determine whether the captured image is a match.

An audio cue system is also provided for that includes a camera, at least one speaker, a microphone, a text-to-speech engine, and a processor in communication with the camera, the speaker, the microphone, and the text-to-speech engine. The processor may be configured to receive captured facial images from the camera to identify persons matching the captured facial image. The processor may also be configured to retrieve information about the identified persons and generate audio cues to the speaker concerning the retrieved information using the text-to-speech engine. In some examples, the processor may also be configured to compare the captured facial images with stored facial images to identify persons matching the captured facial image.

In some examples, the processor may also be configured to generate a faceprint based on a the captured facial images. In such examples, the processor may also be configured to compare the faceprint generated from the captured facial images with a stored faceprint to identify persons matching the captured facial image.

The audio cue system may also include communications hardware for transferring data over a network. In such examples, the processor may further be configured to access stored facial images to identify persons matching the captured facial image. The processor may also be configured to access the stored facial images via a social network. The processor may also be configured to receive inputs from a user regarding what information should be included within the audio cues. The processor may also receive inputs for identifying or confirming the identity of persons in captured images.

A method for providing audio cues is also provide for, including the steps of capturing an image of at least one individual, comparing the image to stored facial data, matching the image to stored facial data, retrieving information related to the stored facial data, transmitting the information to an audio device for presentation to a user, and converting the information into an audio cue using a text-to-speech engine. In some examples of the method, the stored facial data may be a faceprint and the step of comparing the image may include generating a faceprint based on the captured image.

BRIEF DESCRIPTION OF THE DRAWINGS

Various aspects of at least one implementation of a facial or feature recognition system are discussed below with reference to the accompanying figures. The figures are provided for the purposes of illustration and explanation and are not intended as a definition of the limits of the disclosure.

DETAILED DESCRIPTION

It should be understood that the following descriptions are not intended to limit the disclosure to an exemplary implementation. To the contrary, it is intended to cover alternatives, modifications, and equivalents as may be included within the spirit and scope of the described subject matter.

Figure 1:
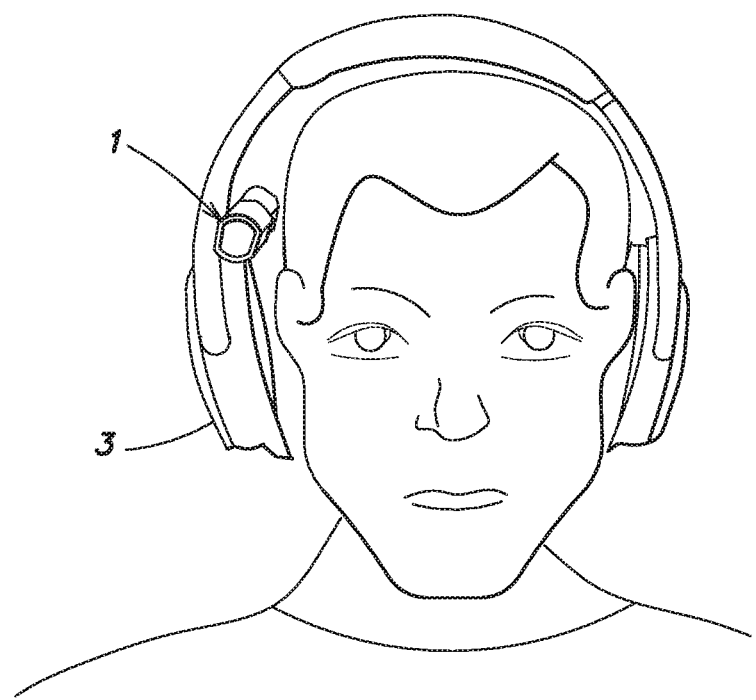
FIG. 1 is a front view of headphones and a camera that may be used in examples of the present disclosure.

FIG. 1 is a front view of a camera 1 and pair of headphones 3, as may be used in some examples of the present disclosure. In some examples, one or more cameras 1 may be mounted onto headphones 3 as shown in FIG. 1. While camera 1 is shown as being mounted to a headband of headphones 3, camera 1 could alternatively be mounted to an ear cup (for on-ear or around-ear headphones) or earbud (for in-ear headphones), or other areas of headphones 3, or incorporated into headphones 3. Headphones 3 may also be any wearable set of speakers, such as speakers that may be worn around a user's neck and/or shoulders, or that are incorporated into a garment or apparel item, for example. In other examples, other wearable cameras may be used in tandem with a pair of headphones, such as a camera embedded within a pair of glasses or worn on another apparel or clothing item. Any camera capable of communicating information directly to a pair of headphones or though another intermediary device may be utilized by the present disclosure. U.S. patent application Ser. No. 15/140,957, titled "Portable Camera," the disclosures of which are hereby incorporated by reference in their entirety, provides an example of a camera that may be utilized with the present disclosure, although other types of cameras may be utilized.

Figure 2:
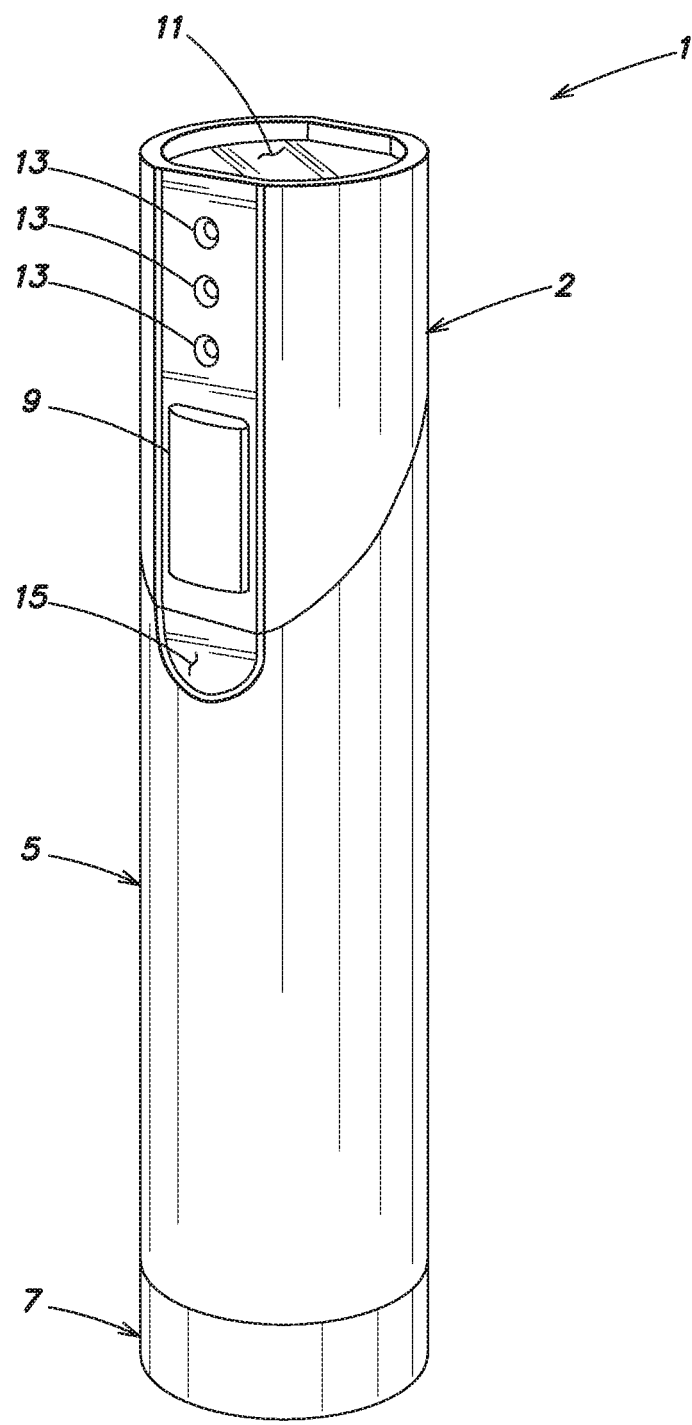
FIG. 2 is a top, front view of a camera that may be used in examples of the present disclosure.

FIG. 2 is a front, top perspective view of a camera 1 that may be used in some implementations of the present disclosure. As shown, camera 1 may be an elongate camera including a camera section 2, a body section 5, and an attachment portion 7. Camera section 2, body section 5, and/or attachment portion 7 may be movable or rotatable with respect to one another. In other examples, camera 1 may not include distinct sections, but may instead comprise one integrally-formed camera housing for supporting a camera. Camera section 2 may also include one or more buttons 9 for controlling the primary functions of the camera, such as powering the camera on or off, starting and stopping recordings, or activating facial recognition features, as disclosed herein. In other examples, camera 1 and headphones 3 may be controlled by voice commands and/or a voice-activated virtual assistant, as disclosed herein, and buttons 9 may be unnecessary. Camera section 2 may house camera components in its interior (not shown), and includes a camera lens 11 at its top side. Camera section 2 may also include one or more perforations 13 for permitting sounds to interact with an internal microphone, which may be an arrayed microphone, as discussed below with respect to FIG. 3. As one of ordinary skill in the art will appreciate, however, perforations 13 may be disposed elsewhere on camera 1 and need not be confined to camera section 2.

In some examples, camera 1 may be tethered to an external computing device, such as a computer, laptop computer, tablet, or smartphone equipped with controlling software either through a wireless or cabled connection. In such examples, an external device may control the functions of camera 1 and headphones 3, including any facial recognition features. Camera 1 may therefore operate as a stand-alone device, storing information on built-in memory, or it may operate in tandem with an external computing device in order to save, store, edit, and upload images or videos gathered from camera 1 using the capabilities of the external computing device, including any available network capabilities.

In some implementations, camera section 2 and body section 5 may be configured to rotate or swivel with respect to one another. The swiveling action may aid camera section 2 in tracking faces or features in some implementations. Camera section 2 may also be affixed to body section 2 through the use of an internal joint 17, as shown and described with respect to FIG. 3, below. Furthermore, the angled surfaces between camera section 2 and body section 5 may cooperate to form an angle with body section 5 of between 90-degrees and 180-degrees proximate internal joint 17. In some examples internal joint 17 may be a controllable servo, that can direct the focus of camera section 2 towards a selected face or object identified within a room. The controllable servo may receive directional information from control circuitry within camera 1 or a secondary computing device.

Figure 3:
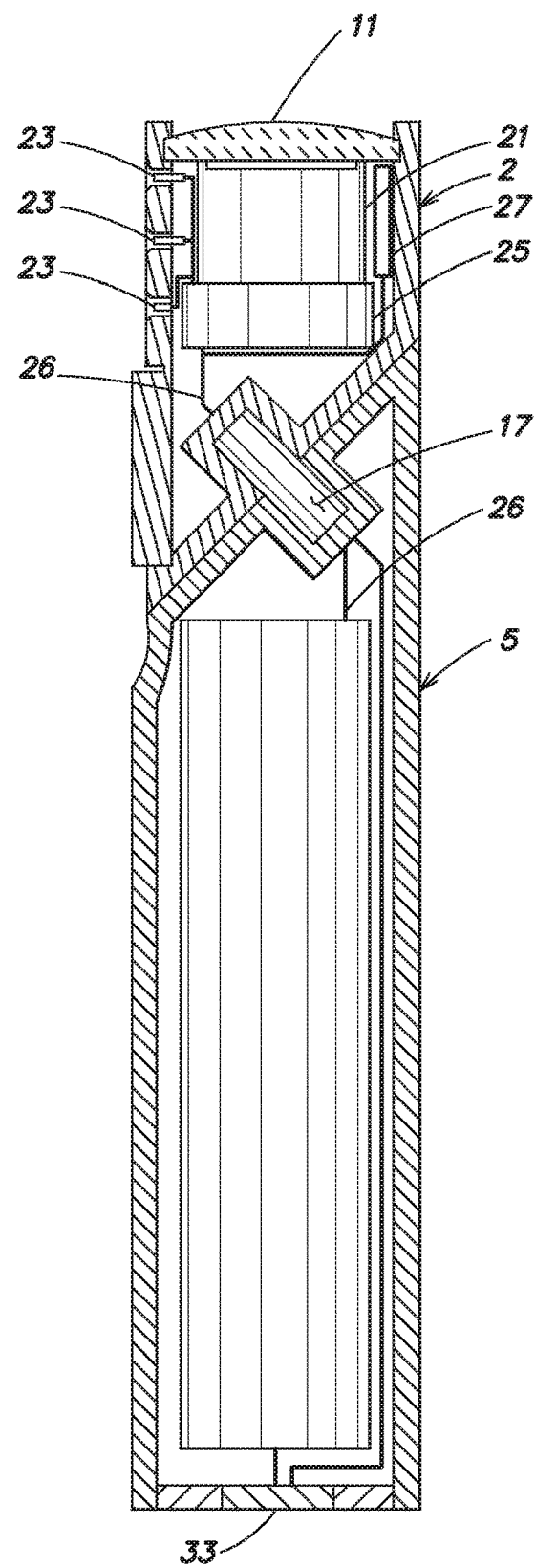
FIG. 3 is a cross section schematic of a camera that may be used in examples of the present disclosure.

FIG. 3 is a cross-sectional view of camera 1 in some examples of the present disclosure. As shown, camera section 2 comprises an external lens 11 above camera module 21. Camera module 21 may be coupled to main board 25, which may include memory, non-volatile memory, one or more processors programmed to control the operations of camera 1, as well as communications hardware in order to enable one or more wired or wireless connections such as USB, Bluetooth, and/or Wi-Fi. Camera section 2 may also include an arrayed microphone 23, which may be disposed within perforations 13. Arrayed microphone 23 may comprise a plurality of omnidirectional microphones, directional microphones, or any mixture thereof, distributed about the interior of camera section 2. Arrayed microphone 23 may also be coupled to main board 25 for simultaneous processing of the signals from each individual microphone in a manner familiar to one of ordinary skill in the art. Arrayed microphone 23 may employ beamforming or other techniques to achieve directionality in a particular direction, for example, towards a captured or recognized face or feature, such as when a facial or feature recognition feature has been activated.

As one of ordinary skill in the art will appreciate, in some examples, one or more components discussed herein as being associated with camera 1 may instead be incorporated into headphones 3. For example, arrayed microphone 23 may be incorporated within the housing of one or more speakers or earcups on headphones 3. Furthermore, the components previously described as being housed within camera section 2 may also be incorporated within headphones 3, for example, along a headband or within an earcup. As such, examples of the present disclosure may also include a pair of headphones intended to provide both sound capabilities, as well as a microphone 23 and/or a camera 1 which may be intergral to the headphones. Therefore, the present disclosure is not limited to examples utilizing separate speakers, microphones, and cameras. In such examples, the camera components and the arrayed microphones may be the same as those described herein with respect to camera 1.

Camera 1 may also include a software-implemented facial recognition capability by which a user may be aided in a number of tasks. Such software may be locally stored on the main board 25 of the camera, on the headphones 3, or may be remotely accessible and installed on a companion computing device, such as a smart phone, for example. Working in tandem with headphones 3, camera 1 may be used to activate an audio cue application for retrieving information reagarding features or faces recognized by the camera. In one example, the audio cue application can recognize a person's face and provide the name of the person to the headphone wearer through audio cues produced by headphones 3. This feature may be particularly useful when a user is conducting business within a large crowd of people and wishes to convey familiarity with as many people in the room as possible. In such examples, it may be advantageous to utilize an inconspicuous audio device for headphones 3, such as a single earbud or earpiece. Likewise, when a headset is being employed, it may be advantageous to equip the headset with a visual indicator that the audio cue application is in use, so that other participants at an event still feel free to converse with the user. Such visual indicators may take any form suitable for indicating that the audio cue application is activated or that the user still wishes to engage in conversation. Examples of a suitable visual indicator may be an LED with an inviting color, such as green, or a small display screen with text indicating that the audio cue application is running. However, any mechanism for indicating that the audio cue application is activated or that the user still wishes to engage in conversation may be employed. The audio cue application may also provide additional information for each recognized person, such as the name of their spouse or children, or who the person's employer is.

In order to identify each person, the audio cue application may compare a captured image with images from a database of facial images. The images may have previously been captured and identified by the user during prior sessions of the audio cue application. Alternatively, information may be retrieved from an external contacts database (e.g. Outlook) or social media databases (e.g. Facebook or LinkedIn) to recognize the person and retrieve information from these same sources. Once retrieved, any relevant information may be passed to a text-to-speech engine in order to convert it into an audio cue that can be played through speakers in headphones 3.

In other examples, the audio cue application may be able to retrieve publicly available information relevant to an interaction in real time. For example, camera 1 may be employed to identify other relevant information associated with a person being viewed by a user, such as a logo on their shirt or an identification badge they are wearing. Camera 1 may be configured to capture images of such additional features, extract any visible text, names, or logos, and search publicly available databases for information relevant to the captured features. Any potentially relevant information retrieved by the system may be transmitted to headphones 3 to be played as an audio cue indicating where the person may work, the origin of any visible insignia on their clothing, or even any shared social contacts on social media platforms, such as Facebook or LinkedIn.

Figure 4:
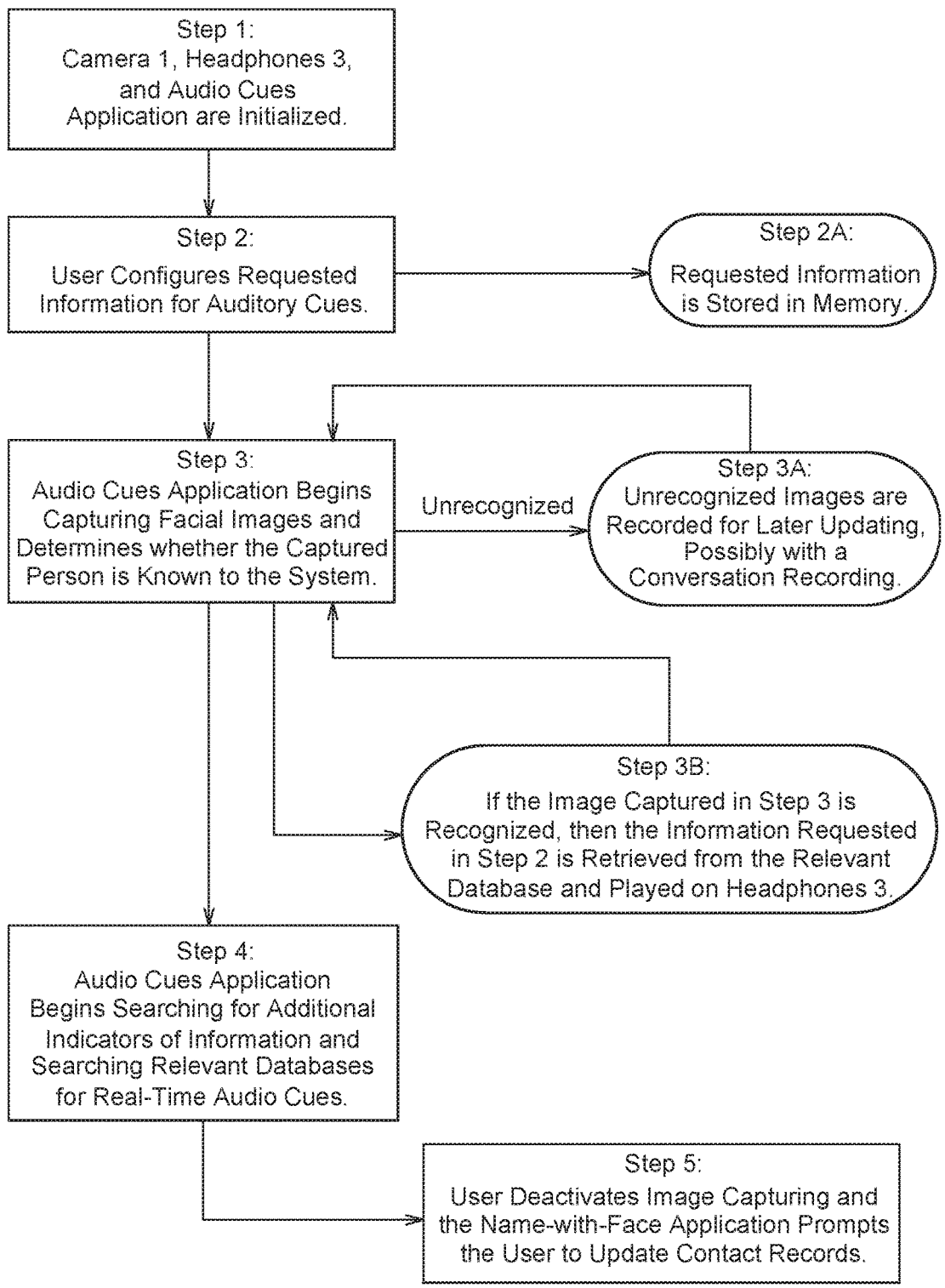
FIG. 4 is a flowchart showing the steps of a routine for identifying people using facial recognition and retrieving information regarding the identified person.

FIG. 4 is a flowchart showing the operation of a routine for providing audio cues during personal interactions. In step 1, camera 1, a pair of headphones 3, and the audio cue application are initialized. In some examples, the audio cue application may be activated through a voice-activated virtual assistant running on the headphones or camera 1, though it could also be manually activated by pressing buttons 9 on camera 1 or via an app running on a secondary computing device. The audio cue application may be stored in memory within the main board 25 and run by processors within camera 1. In other examples, camera 1 may be in communication with a secondary computing device, such as a smartphone, a tablet, laptop computer, or other computing device, which may store and run the audio cue application while controlling camera 1 and headphones 3. In other examples, headphones 3 may store and run the audio cue application.

At step 2, once the audio cue application is initialized, information may be solicited from a user regarding what information the user is requesting for auditory cues. In some examples, audio cues may be selected using a graphical user interface on a secondary computing device, such as a dropdown menu for selecting which categories of information the user may want to receive regarding the people the user will encounter. In other examples, a voice-activated virtual assistant may be provided for giving voice commands directly to camera 1 or headphones 3 regarding what categories of information should be provided in audio cues. In some situations the user may wish only to know the first and/or last name of any persons recognized by the system. In other examples, a user may also wish to know the name of a recongnized person's spouse and children, if any. Alternatively, a user may wish to know where a recognized person works, where they went to school, or their home town. Any information available through the system or connected databases may be selected for inclusion as an audio cue. Once the preferred audio cuses are selected, they are stored in memory by the audio cue application in step 2A.

At step 3 the audio cue application may also instruct camera 1 to begin capturing images of the faces of people who come within proximity of the camera. Camera 1 may be configured to automatically detect faces and capture the best images possible for facial recognition. Camera 1 may also capture only those images that are within a prescribed proximity to the user, such that conversation may be likely or possible. Once captured, each facial image may be analyzed by the audio cue application, either locally on camera 1 or after being transferred to a secondary computing device. For each image, the audio cue application begins automatically determining whether a match exists between the captured image and persons known by the system. In some examples, this may be accomplished by comparing the captured image to images of known persons stored locally within a database dedicated to the audio cue application. Such local databases may correlate facial images with information known about the associated persons, such as their name or other information that may be wanted as an audio cue. In other examples, facial images captured by camera 1 may be compared to images available through other sources, such as information stored within or otherwise accessible through the user's Outlook, Facebook, or LinkdIn accounts.

Any comparison techniques capable of matching a previously-stored image to an image captured by camera 1 known to one of ordinary skill in the art may be utilized as part of the present disclosure. In some examples, images of known persons may be analyzed by the audio cue application prior to inclusion within a facial recognition database. The distinguishable features of each person's face may be stored as a numerical representation of a series of nodal points on the known user's face, thereby creating a mathematical "faceprint" within the audio cue database. Captured images may likewise be analyzed to generate a captured faceprint for mathematical comparison. Images of known persons retrieved from external sources may also be analyzed to create a comparable faceprint as part of the facial recognition process. However, numerous techniques exist for facial recognition and any available techniques may be employed in connection with the present disclosure.

If a captured image is unrecognized by the audio cue application (e.g., if no match is identified by the application), the captured image may be stored for later manual identification by the user at step 3A. To aid a user in later updating their records, camera 1 may record the first few moments of any interactions between the user and the person whose image was captured. The recording may later be retrieved during an updating process to determine whether a user's contact information or the audio cue database should be updated. In some examples, the audio cue application may attempt to identify a new, unrecognized person automatically by listening for certain conversation patterns. For example, the system may continually monitor conversation during social interactions and may be configured to recognize introductions, such as "Hi, I'm Tom Sawyer" or "It's nice to meet you, Tom Sawyer." In such instances, the system may recognize language indicative of an introduction and automatically record the detected name in association with a captured facial image. Other information may be gathered in a similar manner, such as where the person works or other pertinent information a person may provide through conversation.

If the captured image is recognized in step 3, then the audio cue application proceeds to step 3B and retrieves the target information requested in step 2 and transmits an audio cue to headphones 3. The audio cue may be a computer-generated voice played on headphones 3 that reads the requested target information that was available to the system using a text-to-speech engine.

At step 4, the system may also identify other situational information to provide an audio cue. For example, camera 1 may identify other noteworthy indicators, such as an insignia on their shirt, or a company listed on an identification tag. If potential indicators are detected, any relevant text may be extracted, and publicly available databases, such as LinkedIn, Facebook, Google, or Wikipedia, may be searched for any valuable information. The results of any such searches may be converted into an audio cue for immediate playback to the user.

At step 5, a user may deactivate the the audio cue application, which stops camera 1 from capturing any additional facial images. After a session has ended, the audio cue application may prompt the user to update records with any new introductions that were made or confirm the names or other information detected by the system about people encountered. To do so, the audio cue application may begin prompting the user with any captured images that were unrecognized by the system during step 3 on a secondary computing device, such as a smartphone. The system may also present the user with a recorded portion of the event, showing video or audio of any recorded interactions with a target person. If the user recognizes the captured image or recalls an introduction during the recording, the user may update the audio cue database so that the target will be recognized in the future, along with any other pertinent details about the captured person learned during the session.

Figure 5:
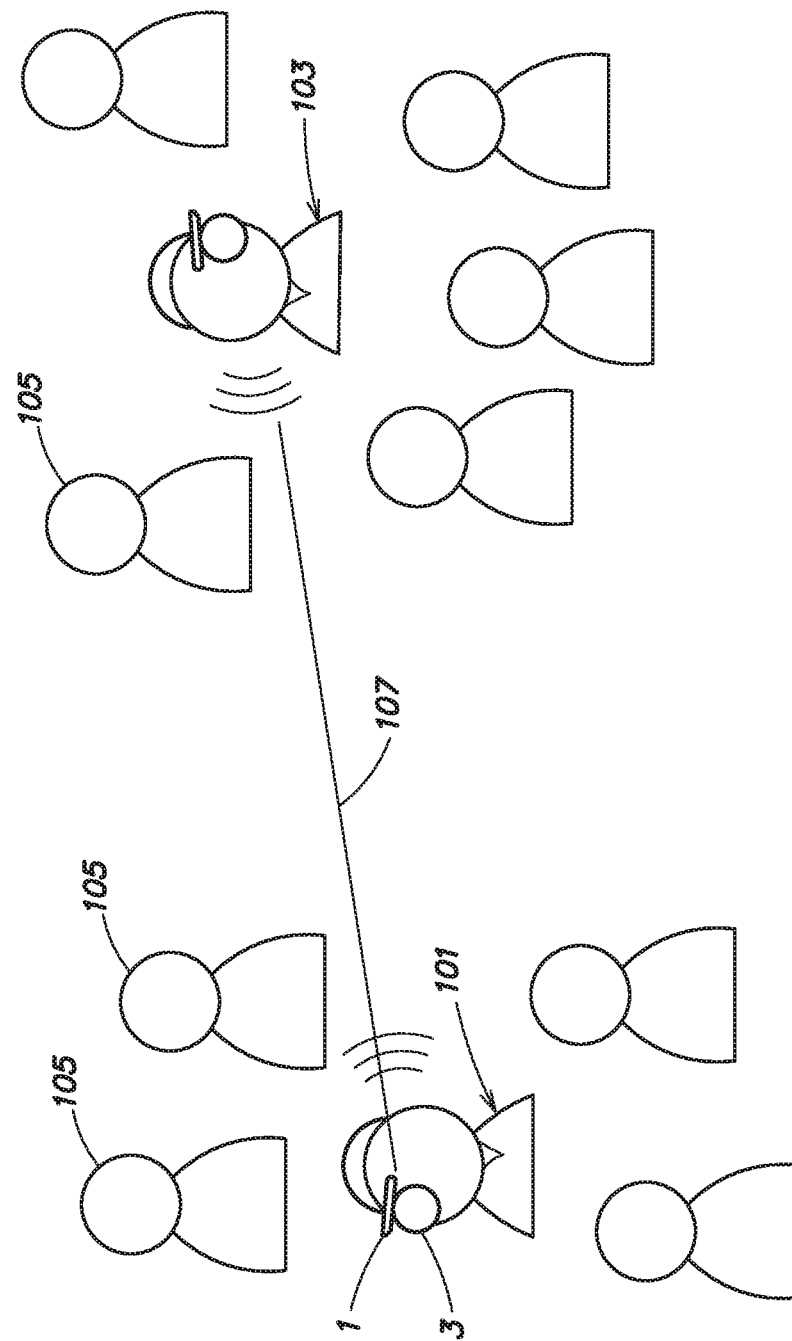
FIG. 5 is a schematic showing how a facial recognition feature may operate in a crowd of people.

Camera 1 and headphones 3 may also be utilized to help run a "face-in the-crowd" application that allows one or more users to communicate across greater distances or within a noisy environment. FIG. 5 is a schematic showing how a facial recognition feature may operate in a crowd of people to aid communications. As shown, a first user 101 within a crowd may be equipped with a pair of headphones 3 and a camera 1, as disclosed herein. The first user 101 may wish to communicate with a target user 103, who may be either distant from the first user or within a situation where it is difficult to hear one another over a crowd 105, for example. In such situations, the first user 101 may wish to utilize the capabilities of their camera and headphones in order to aid communications. To do so, the first user 101 may activate a face-in-the crowd application either through voice activation, buttons 9, through a graphical user interface on a secondary computing device, or using voice commands. Once activated, the first user 101 may instruct camera 1 to begin searching the crowd or area for the target user 103 with whom the first user wishes to communicate. The camera may then begin capturing images of faces within the crowd 105, comparing each captured image to the face of the known target user 103, whose facial image (or faceprint) has already been captured and stored by the application or is otherwise accessible to the application.

In some examples, a user may assist the face-in-the-crowd application to lock onto the target user 103 using a laser pointer 27 or other targeting techniques. For example, a laser pointer or cite 27 may be mounted within or upon camera 1 (as shown in FIG. 3, for example) in a manner familiar to one of ordinary skill in the art and may be arranged to point in a direction indicative of an initial direction of arrayed microphone 23 or camera 1. Laser pointer 27 may provide a visual indication to the user of the initial directionality of camera 1 or arrayed microphone 23, allowing a user to manually guide those components towards target user 103 until their face has been recorded by the system as a target user 103 and the system has determined features of the target user's face for tracking. In other examples, camera 1 or arrayed microphone 23 may provide data to a secondary computing device, which may display the current directionality of the devices to a user via a video image on a graphical user interface. The user interface may allow a user to indicate a desired target user 103 by, for example, maintaining the target user 103 within a crosshairs or target area within the graphical user interface until the target user's face has been recorded by the system and the system has determined identifying features of the target user for tracking. In other examples, laser pointer 27 may be considered unsafe, obtrusive, or threatening. Therefore, laser pointer 27 may be an invisible infrared laser pointer, which may only be detectable by camera 1 (provided it has infrared viewing capabilities) and displayed on a graphical user interface for inconspicuously aiding a user to lock onto a desired target user 103. The system may also store images of other parts of a person's head or body, which may allow the face-in-the-crowd application to match a person even when they are not directly facing the user. Once the camera captures an image identified as being the target user 103, the camera may lock onto the target user's position by identifying facial structures, such as the second user's mouth, and setting that as a focal point for camera 1, thereby maintaining a consistent line of sight 107 between the first user 101 and the target user 103.

Once camera 1 has identified and locked onto the position of second user 103, camera 1 may continually adjust its direction so as to improve communications through the use of arrayed microphone 23. For example, camera 1 may steer arrayed microphone 23 towards the mouth of second user 103 using beamforming, thereby improving the ability of the microphones to pick up the target person's speech. As the target user's speech is received by arrayed microphone 23, the received sounds may be amplified and played through headphones 3. Movement of both the first user and the target user may also be tracked and camera 1 may compensate for the movement. In some examples, movement of the first user 101 is detected by a motion detection device, such as an accelerometer, gyroscope, or other suitable means for detecting motion. Camera 1 may correct for such detected motion by activating a servo at internal joint 17 to maintain line of sight 107 between the first and second user. In some examples, the servo motor may be controlled by an accelerometer or gyroscope or the like with the aid of a separate microcontroller programmed to make the necessary changes to the servo motor in response to signals from the accelerometer or gyroscope. In addition, camera 1 may adjust the directionality of arrayed microphone 23.

Movements of the target user 103 may also be detected by camera 1, based on the perceived movement of an identified facial feature, such as the target user's mouth. Again, the movements of the target user can be accounted for either by adjusting the direction of camera 1 by activating a servo at internal joint 17 or by redirecting arrayed microphone 23. In so doing, camera 1 may allow the first user to hear what the target user is saying despite being distant from the target user or within a noisy environment. Of course, if the target user 103 also possesses a camera 1 and headphones 3, along with the face-in-the-crowd application, the users may carry on a conversation as if they were close to one another, despite being separated or in a noisy environment.

Figure 6:
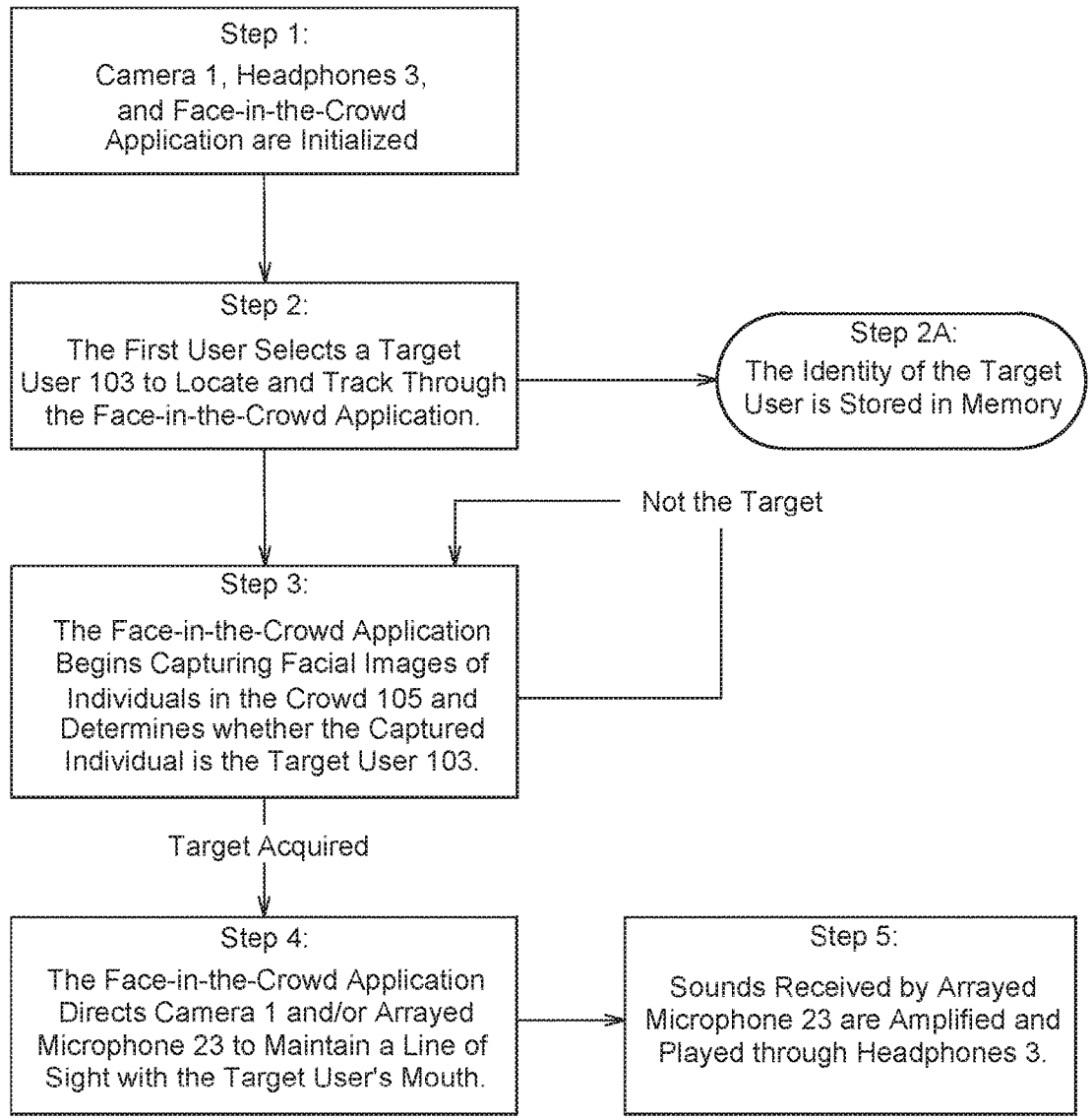
FIG. 6 is a flowchart showing the steps of a routine for identifying a selected person within a crowd and improving communication with the selected person.

FIG. 6 is a flowchart showing the operation of a routine for identifying a selected person within a crowd and improving communications with the selected person. In step 1, a camera 1, headphones 3, and the face-in-the-crowd application are initialized. Again, the face-in-the-crowd application may be stored within and run on camera 1, headphones 3, or a secondary computing device, such as a smart phone, tablet, laptop computer, or other computing devices known to one of ordinary skill in the art. Where the application is run on camera 1 or headphones 3, it may be configured to operate using voice commands, through a graphical user interface appearing on a secondary computing device, or through inputs received via buttons 9.

Once initialized, the face-in-the crowd application may receive inputs from a first user 101 regarding a target user 103 that the first user wishes to identify and track in the area, in step 2. The target user may previously have been identified to the application, and a sample image of their face may have been provided by the first user. In some examples, the target user's image or a file representing a faceprint for the second user may have previously been indexed within a local facial recognition database. In other examples, the face-in-the-crowd application may retrieve images of a target user 103 from other available sources, such as the first user's Outlook, Facebook, or LinkedIn accounts. Alternatively, a user may employ manual targeting features on camera 1 or headphones 3, such as a laser guide 27 for identifying a target user 103. Any available database that includes images and/or facial recognition data of the target user 103, and is accessible to the first user 101, may be utilized by the system. At step 2A, the face-in-the-crowd application stores the selected target user in memory.

At step 3, the face-in-the-crowd application begins capturing facial images within the crowd 105, comparing the captured image with an image of the target user 103. Any suitable method for performing facial recognition known to one of ordinary skill in the art may be utilized in step 3. In some examples, the application may compare captured facial images of the crowd 105 with a stored image of the target user 103. In other examples, captured images of the crowd 105 may be individually processed to generate a faceprint that is a mathematical representation of a series of nodal points on the captured crowd-member's face. The captured faceprint may then be compared to the target user's stored faceprint. If the comparison achieves a threshold comparison level (e.g., a 90% match), the application may determine that the captured facial image from the crowd is from the target user 103. In other examples, only a portion of a target user's faceprint may be compared with captured images within the crowd in order to rapidly identify candidates for a more thorough comparison by the system.

At step 4, once the target user has been verified by the face-in-the-crowd application, the application instructs the camera to maintain the target user's mouth as the focal point for arrayed microphone 23. In some examples, the application may instruct arrayed microphone 23 to employ beamforming or other techniques to achieve directionality towards the target user's mouth in order to isolate sound waves corresponding to the target user's 103 voice. In addition (and when available), the application may send instructions to a controllable servo at internal joint 17 to continually orient camera 1 and arrayed microphone 23 towards the target user's mouth. The controllable servo at joint 17 and arrayed microphone 23 may work in tandem to maintain the directionality of the microphone. As the first user 101 or the target user 103 continue to move within the crowd, the face-in-the-crowd application may continually adjust the direction of the controllable servo or arrayed microphone 23. In some examples, the servo motor may be controlled locally by an accelerometer or gyroscope or the like with the aid of a separate microcontroller programmed to make the necessary changes to the servo motor in response to signals from the accelerometer or gyroscope in order to maintain the orientation of camera 1 towards the target user 103.

At step 5, sounds received by arrayed microphone 3 from the target user's mouth are amplified and played through headphones 3. The remote sounds may be amplified or augmented by the headphones to further improve the wearer's ability to hear the sound. In some examples, the headphones 3 may also cancel other, unwanted noises detected in the area through active noise control or noise cancelling techniques, as are familiar to one of ordinary skill in the art. The system may also retain information regarding the target user's voice in order to improve noise-cancelling in future interactions. In some examples, the effectiveness of microphone 3 may be further improved by determining the current distance to the target user 103 or device. This may be accomplished either by employing an infrared proximity detector, including infrared light emitting diodes and an infrared sensor. In some examples, laser pointer 27 may be an infrared LED and may also include an infrared sensor for determining a distance to target. In other examples, an ultrasonic sensor may also be employed to determine distances in a manner familiar to one of ordinary skill in the art.

Figure 7:
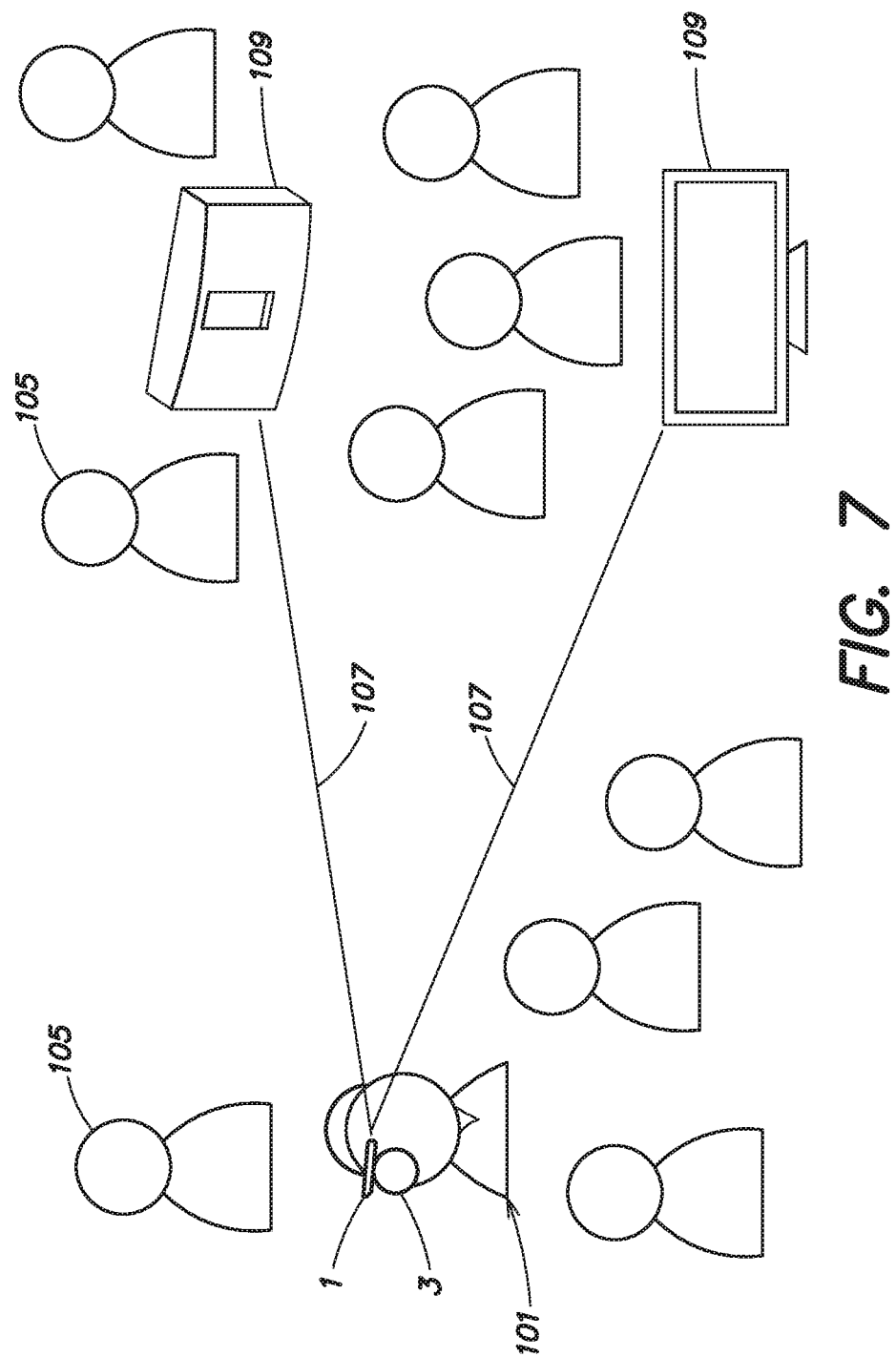
FIG. 7 is a schematic showing how a device recognition feature may operate to isolate and amplify sounds from a selected device.

In some examples, the face-in-the-crowd application may be used to focus an arrayed microphone on a target device 109 instead of a target user 103. FIG. 7 is a schematic showing how a device recognition feature may operate to isolate sounds from a selected device. As shown in FIG. 7, a user 101 within a crowd may be equipped with a pair of headphones 3 and a camera 1, as disclosed herein. The user 101 may wish to listen to a target device 109, which may be either distant from the first user or within a situation where it is difficult to hear the target device over a crowd 105, for example when attempting to listen to a sound system during a noisy party, or when attempting to listen to a television in a public place. In such situations, user 101 may wish to utilize the capabilities of their camera and headphones in order to improve their listening experience. In order to do so, the first user 101 may activate the face-in-the crowd application either through voice activation, buttons 9, or through a graphical user interface on a secondary computing device. Once activated, the user 101 may instruct camera 1 to begin searching the crowd or area for the target device 109 to which the first user wishes to listen. The camera may then begin capturing images of detected devices within the crowd, comparing each captured image to known parameters for the target device 109 which may have already been captured and stored by the application. Alternatively, a user may employ the manual targeting techniques discussed above, such as utilizing laser guide 27 or video targeting using a crosshairs on a graphical user interface. Once the camera captures an image identified as being the target device 109 the camera may lock onto the target's position by identifying features of the device, such as a display screen, a speaker, or a housing and setting that as a focal point for camera 1.

Once camera 1 has identified and locked onto the position of the target device 109, camera 1 may continually adjust its direction so as to improve the listening experience through the use of arrayed microphone 23. For example, camera 1 may steer arrayed microphone 23 towards a detected speaker on target device 109, thereby improving the ability of the microphones to pick up the sounds being produced by the target device. As the target's sound is received by arrayed microphone 23, the received sounds may be amplified and played through headphones 3. The remote sounds may be amplified or augmented by the headphones to further improve the wearer's ability to hear the sound. In some examples, the headphones 3 may also cancel other, unwanted noises detected in the area through active noise control or noise cancelling techniques, as are familiar to one of ordinary skill in the art. Again, in some examples, the effectiveness of microphone 3 may be further improved by determining the current distance to the device 109. This may be accomplished either by employing an infrared proximity detector, as previously described, or an ultrasonic sensor in a manner familiar to one of ordinary skill in the art.

Movement of both the user and the target device may also be tracked and camera 1 may compensate for the movement. In some examples, movement of the user may be detected by a motion detection device, such as an accelerometer, gyroscope, or other suitable means for detecting motion. Camera 1 may correct for such detected motion by activating a servo at internal joint 17 to maintain line of sight 107 between the user and the target device. In some examples, the servo motor may be controlled by an accelerometer or gyroscope or the like with the aid of a separate microcontroller programmed to make the necessary changes to the servo motor in response to signals from the accelerometer or gyroscope. In addition, camera 1 may adjust the directionality of arrayed microphone 23. Movements of the target device 109 may also be detected by camera 1, based on the perceived movement of an identified feature of the device, such as a detected speaker. Again, the movements of the target device can be accounted for either by adjusting the direction of camera 1 by activating a servo at internal joint 17 or by redirecting arrayed microphone 23. In so doing, camera 1 may allow the first user to hear the sounds being produced by a target device, despite being farther away or within a noisy environment. In this example, the face-in-the-crowd application would follow the same steps disclosed in FIG. 6, for example, except that the application would be configured to search for, identify, and track a target device 109 as opposed to a target user 103.

In some examples, camera 1 or headphones 3 may also include a virtual personal assistant, for controlling the functions of the camera 1 and headphones 3. The virtual personal assistant may be implemented through software stored and running on camera 1, headphones 3, or may be remotely accessible through a wireless module on camera 1 or headphones 3. In other examples, the virtual assistant may be accessible through a wireless module on a secondary computing device, such as a smart phone, that receives and interprets voice commands from a user and determines what action to take following the command. In some examples, the user may speak a wake up word or phrase to activate the voice command system, such as "Hey Bose." The wake-up word may be followed by a voice command, such as "talk to . . . ," "listen to . . . ," or "tell me their name." For example, the "talk to . . . " voice command may initiate the face-in-the-crowd application and cause it to automatically begin searching for the target user 103 identified in the voice command (e.g. "Hey Bose, talk to Joe."). The "listen to . . ." command may initiate the face-in-the-crowd application, but cause it to automatically begin searching for the target device 109 identified in the voice command (e.g. "Hey Bose, listen to the SoundTouch device."). The "tell me their name" command may automatically initiate the audio cue application and automatically instruct the application to provide any additional information the user wishes to be told (e.g. "Hey Bose, tell me their name, their spouse's name, their kids' names, and where they work."). By incorporating a voice-activated virtual personal assistant, the devices of the present disclosure may be operated without necessarily consulting a graphical user interface on a secondary device and without the need for manual inputs, such as using buttons 9.

One of skill in the art will appreciate that the systems, methods and apparatuses outlined above may include various hardware and operating software, familiar to those of skill in the art, for running software programs as well as communicating with and operating any devices, including, for example, a camera, headphones, a secondary computing device, a user interface, a computer network, a sound system, and any other internal or external devices. Such computerized systems may also include memory and storage media, and other internal and external components which may be used for carrying out the operations of this disclosure. Moreover, such computer systems may include one or more processors for processing and controlling the operation of the computer system, thus, embodying the processes of this disclosure. To that end, the processor, associated hardware and communications systems may carry out the various examples presented herein.

While the disclosed subject matter is described herein in terms of certain exemplary implementations, those skilled in the art will recognize that various modifications and improvements can be made to the disclosed subject matter without departing from the scope thereof. As such, the particular features claimed below and disclosed above can be combined with each other in other manners within the scope of the disclosed subject matter such that the disclosed subject matter should be recognized as also specifically directed to other implementations having any other possible permutations and combinations. It will be apparent to those skilled in the art that various modifications and variations can be made in the systems and methods of the disclosed subject matter without departing from the spirit or scope of the disclosed subject matter. Thus, it is intended that the disclosed subject matter include modifications and variations that are within the scope of the appended claims and their equivalents.

What is claimed:

1. A recognition system comprising:
   a camera comprising a body section and a camera section, the body section and the camera section being fixed together at an internal movable joint that is internal to the body section and internal to the camera section and that comprises a controllable servo;
   at least one speaker;
   a microphone; and a processor in communication with said camera, said speaker, and said microphone;

wherein said processor is configured to recognize at least one of faces or devices;

wherein said processor is configured to receive a selection of at least one face or device to be monitored; and wherein said processor is configured to direct at least one of said camera or said microphone toward the at least one selected face or device and provide audio received from the at least one selected face or device to said speaker, wherein said processor is configured to move said camera section relative to said body section at said internal movable joint to direct said camera section toward the at least one selected face or device, using said controllable servo.

2. The recognition system of claim 1, wherein said microphone is an arrayed microphone and said processor is configured to direct said microphone toward the at least one selected face or device using beamforming.

3. The recognition system of claim 1, wherein said processor is further configured to compare at least one pre-recorded image of said at least one selected face or device to be monitored with images captured by said camera in order to determine a position of the at least one selected face or device to be monitored.

4. The recognition system of claim 3, further comprising communications hardware for transferring data over a network.

5. The recognition system of claim 4, wherein said processor is further configured to access said at least one pre-recorded image of said at least one selected face or device to be monitored via said communications hardware.

6. The recognition system of claim 5, wherein said processor is further configured to access said at least one pre-recorded image of said at least one selected face or device to be monitored via a social network.

7. The recognition system of claim 1, wherein said processor is further configured to generate a faceprint based on a facial image.

8. The recognition system of claim 7, wherein said processor is further configured to compare at least one stored faceprint with a faceprint derived from an image captured by said camera in order to determine whether the captured image is a match.

9. The recognition system of claim 1, further comprising a laser pointer mounted to the camera and arranged to point in a direction indicative of an initial direction of the camera.

10. An audio cue system comprising:
a camera comprising a body section and a camera section, the body section and the camera section being fixed together at an internal movable joint that is internal to the body section and internal to the camera section and that comprises a controllable servo;
at least one speaker;
a microphone;
a text-to-speech engine; and
a processor in communication with said camera, said speaker, said microphone, and said text-to-speech engine;
wherein said processor is configured to receive a captured facial image of a face from said camera to identify a person matching said captured facial image;
wherein said processor is further configured to retrieve information about the identified person and generate and provide audio cues to said at least one speaker concerning said retrieved information using said text-to-speech engine; and
wherein said processor is configured to move said camera section relative to said body section at said internal movable joint to direct said camera section toward the face, using said controllable servo.

11. The audio cue system of claim 10, wherein said processor is further configured to compare said captured facial image with a stored facial image to identify said person matching said captured facial image.

12. The audio cue system of claim 11, wherein said processor is further configured to generate a faceprint based on said captured facial image.

13. The audio cue system of claim 12, wherein said processor is further configured to compare said faceprint generated from said captured facial image with a stored faceprint to identify said person matching said captured facial image.

14. The audio cue system of claim 10, further comprising communications hardware for transferring data over a network.

15. The audio cue system of claim 14, wherein said processor is further configured to access stored facial images to identify said person matching said captured facial image.

16. The audio cue system of claim 15, wherein said processor is further configured to access said stored facial images via a social network.

17. The audio cue system of claim 10, wherein said processor is further configured to receive inputs from a user regarding what information should be included within said audio cues.

18. The audio cue system of claim 10, wherein said processor is further configured to receive inputs for identifying or confirming an identity of said person in said captured facial image.

19. The audio cue system of claim 10, configured to recognize language indicative of an introduction and to automatically record a name detected in the language indicative of the introduction in association with the captured facial image.

20. A method for providing audio cues comprising:
capturing an image of at least one individual with a camera comprising a body section and a camera section, the body section and the camera section being fixed together at an internal movable joint that is internal to the body section and internal to the camera section and that comprises a controllable servo;
moving said camera section relative to said body section at said internal movable joint to direct said camera section toward the individual, using said controllable servo;
comparing said image to stored facial data;
matching said image to the stored facial data;
retrieving information related to the stored facial data;
converting said information into an audio cue using a text-to-speech engine; and
transmitting said audio cue to an audio device for presentation to a user.

21. The method of claim 20, wherein said stored facial data comprises a faceprint and the step of comparing said image comprises generating the faceprint based on said captured image.

22. The method of claim 20, further comprising manually guiding the camera to the at least one individual using a laser pointer mounted to the camera.

* * * * *